May 10, 1966     R. E. WALSH     3,250,563

CARGO HOOK

Filed Oct. 2, 1964

INVENTOR.
RALPH E. WALSH
BY Albert F. Bonman
ATTORNEY

United States Patent Office 3,250,563
Patented May 10, 1966

3,250,563
CARGO HOOK
Ralph E. Walsh, Long Branch, N.J., assignor to Breeze Corporations, Inc., Union, N.J., a corporation of New Jersey
Filed Oct. 2, 1964, Ser. No. 401,000
3 Claims. (Cl. 294—78)

This invention relates to cargo hooks such as are used in connection with winches, hoists and the like.

In the operation of winches and hoists and particularly airborne winches and hoists, it is customary to attach a hook to the end of the hoist cable for engaging the load. On occasion, and particularly where the winch or hoist is used on a helicopter the device may be employed in rescue operations. At other times, the winch or hoist may be used to pull cargo across the floor of the helicopter for storage during transportation. While one winch or hoist can perform both operations, the type of cargo hook employed for each purpose at present requires different operating characteristics. In the case of rescue work the person being raised by the hoist should be in a stationary position and not spun around as the cable is reeled in. The air-stream will normally stabilize a person being raised and in order to keep the cable from spinning him it is necessary to provide a hook which will swivel about the cable. On the other hand, if a cable is permitted to swivel under conditions of extremely high load it will lengthen the outer strands of the cable placing increasingly heavy demands upon the inner strands so that eventual cable failure will result.

Accordingly, it is an object of the present invention to provide a cargo hook assembly which can be used for most rescue operations and the movement of heavy loads.

Another object of the present invention is to provide a simplified cargo hook assembly operable over a wide variety of lifting operations.

Still another object of the present invention is to provide a cargo hook assembly having a minimum number of parts and adapted to easy maintenance practices.

A feature of the present invention is its use of a frictional engagement between the hook portion and the housing of the assembly whereby cable rotation is prevented under conditions of heavy load.

Another feature of the present invention is its swivel arrangement whereby the cable can rotate with respect to the hook under conditions of light loads, such as rescue operations.

The invention consists of the construction, combination and arrangement of parts, as herein illustrated, described and claimed.

In the accompanying drawing, forming a part hereof there is illustrated one form of embodiment of the invention, in which drawing similar reference characters designate corresponding parts, and in which.

Figure 1:
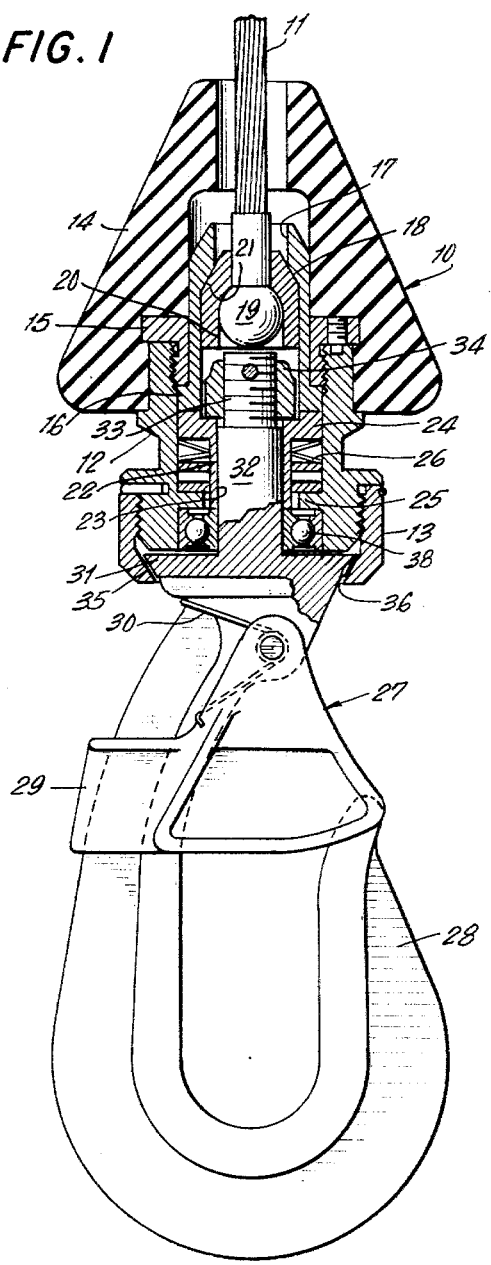
FIGURE 1 is a view in side elevation of a cargo hook assembly according to the present invention with certain portions shown in vertical sections.
Figure 2:
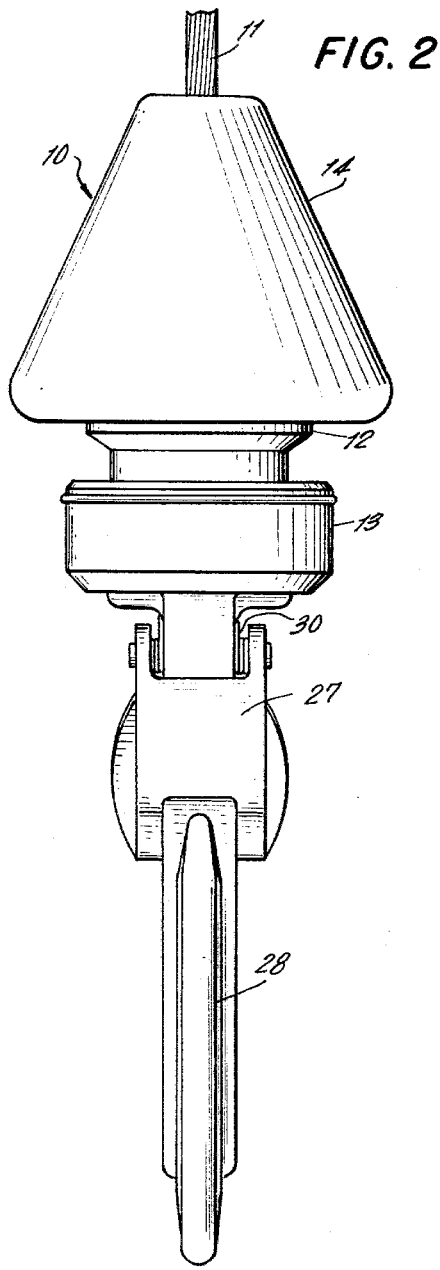
FIGURE 2 is an end view of the cargo hook shown in FIGURE 1.

Referring to the drawing, 10 indicates a cargo hook assembly secured to the end of a cable 11. The cargo hook is built around a housing 12, having a ferrule 13, threadably secured at one end thereof and a resilient bumper 14, of substantially conical shape secured to the opposite end of said housing. A flanged retaining plug 15 is threadably secured to the bumper end of the housing 12, as indicated at 15, and serves to retain not only the bumper 14, but a thimble member 16 which is carried within the housing 12. The thimble 16 is formed with a two-diameter bore 17 in which the upper portion thereof is of smaller diameter than the lower portion. A tapered bearing surface 18 is provided in the bore 17 between the two portions thereof.

The cable 11, is secured within the housing by means of a ball and socket arrangement consisting of a ball member 19, secured to the cable 11, and a socket 20 to receive the ball 19. The socket 20 is centrally bored to permit the cable 11 to pass therethrough. The top of the socket member 20 is tapered as indicated at 21, to fit snugly within the tapered portion of the bore 17, of the thimble 16.

A sleeve 22 is slidably carried within the housing 12 and formed with a central bore 23. The upper portion of the sleeve 22 is flanged as indicated at 24, and is spaced from an internal flange 25 extending into the housing 12. A spring member 26 is disposed between the flanges 24, 25, and normally urges them apart.

The lower portion of the assembly consists of the customary hook 27, having a bail 28, and a latch 29, swingably secured thereto and urged into a closed position by means of the spring 30. The upper portion of the hook 27 is formed with a frusto conical collar 31, and an upwardly extending securing shaft 32. The upper portion of the shaft 32 is threaded as indicated at 33, to receive a nut 34. The nut 34 bears against the upper face of the flange 24, on the sleeve 22. The nut 34 therefore serves to secure the hook member 27 within the assembly.

The ferrule 13 is provided with a tapered seat 35, at the hook receiving end thereof. The tapered seat 35 matches and receives the outer bearing surface 36 of the collar 31.

A ball bearing 38 is disposed between the top of the frusto conical collar 31 and the flange 25. In addition, a clearance is provided between the collar 31, and the bottom of the housing 12. This clearance may be adjusted by tightening or loosening the ferrule 13.

With the device assembled as shown in FIGURE 1, its operation will be apparent. When a light load such as is encountered in rescue operations is attached to the bail 28, the spring members 26 hold the flange 24 in the up or spaced position away from the flange 25. In this position, the clearance between the frusto conical collar 31, and the tapered seat 35 of the ferrule 13 permits the hook to swivel within the housing 12. Alternately, the hook may remain stationary and the cable 11 may rotate with the housing 12 upon the ball bearings 38. The result is that the person being rescued will not be spun about.

When a heavy load is applied to the bail 28 as in pulling cargo across the floor of aircraft, the spring 26 will be compressed bringing the bearing surface 36 of the frusto conical collar into frictional engagement with the tapered seat 35 of the ferrule 13. At this juncture, the housing and cable are locked together and the cable cannot twist as the load is applied.

From the foregoing it will be seen that there has been provided a cargo hook which will operate as a fixed hook when pulling heavy loads to the great advantage of long cable life, and which will permit the cable to swivel therein under light load conditions, thereby providing stability during rescue operations.

Having thus fully described the invention, what is claimed as new and desired to be secured by Letters Patent of the United States, is:

1. A cargo hook assembly comprising a hollow housing, a hook member rotatably secured at one end within the housing and extending therefrom, a frusto conical collar on the hook member within the housing, a ferrule carried by the housing overlying the collar, a tapered bearing surface within the ferrule adapted to receive the collar in frictional engagement and spring means within the housing to yieldably separate the collar and ferrule in the absence of heavy hook loading.

2. A cargo hook assembly comprising a hollow housing, a thimble within said housing and longitudinally slidable therein, a hook member rotatably secured at one end within the thimble and extending therefrom, a frusto conical collar on the hook member within the housing, a ferrule carried by the housing overlying the collar, a tapered bearing surface within the ferrule adapted to receive the collar in frictional engagement and spring means within the housing to yieldably separate the collar and ferrule in the absence of heavy hook loading.

3. A cargo hook assembly comprising a hollow housing, a thimble within said housing and longitudinally slidable therein, a hook member rotatably secured at one end within the thimble and extending therefrom, a frusto conical collar on the hook member within the housing, a ferrule carried by the housing overlying the collar, a tapered bearing surface within the ferrule adapted to receive the collar in frictional engagement, an outwardly extending flange on the thimble, an inwardly extending flange on the housing spaced from the thimble flange and spring means within the housing between the housing and thimble flanges to yieldably separate the collar and ferrule in the absence of heavy hook loading.

References Cited by the Examiner
UNITED STATES PATENTS

| | | | |
|---|---|---|---|
| 1,713,586 | 5/1929 | Wright | 294—82 X |
| 1,842,638 | 1/1932 | Wigle | 294—82 |

GERALD M. FORLENZA, *Primary Examiner.*

G. ABRAHAM, *Assistant Examiner.*